United States Patent [19]

Brenner

[11] 3,893,735

[45] July 8, 1975

[54] RESILIENT SEALING MEANS FOR SELF-ADJUSTING BEARINGS

[75] Inventor: Adolf Brenner, Schweinfurt, Germany

[73] Assignee: SKF Industrial Trading and Development Company, B.V., Amsterdam, Netherlands

[22] Filed: Sept. 6, 1973

[21] Appl. No.: 394,667

[30] Foreign Application Priority Data

Sept. 16, 1972  Germany............................ 7234157

[52] U.S. Cl................ 308/36.1; 308/72; 308/187.1
[51] Int. Cl..... F16c 23/04; F16c 33/74; F16j 15/54
[58] Field of Search................... 308/187.1, 36.1, 72

[56] References Cited
UNITED STATES PATENTS

| | | | |
|---|---|---|---|
| 1,787,459 | 1/1931 | Tawresey......................... | 308/187.1 |
| 2,667,388 | 1/1954 | Schick ............................ | 308/187.1 |

Primary Examiner—M. Henson Wood, Jr.
Assistant Examiner—Howard Beltran
Attorney, Agent, or Firm—Murray Schaffer

[57] ABSTRACT

A spherically adjustable bearing or an adjustable slide bearing is provided having a body in which an inner and outer race ring adapted to journal a shaft is mounted. The bearing is provided with resilient sealing means for axially closing the bearing which comprises a pair of sealing discs, one of which is axially movable with respect to the other. The discs are provided with cooperating surfaces acting in conjunction with each other to provide an adjustably movable seal, a locking ring is provided to support the seal means in the bearing and spring means is interposed between the locking ring and the movable disc to normally bias the movable disc with respect to the other disc. The locating ring and the movable disc are provided with axially overlapping members which form an adjustable seal movable in response to the axial or angular adjustment of the bearing itself.

7 Claims, 1 Drawing Figure

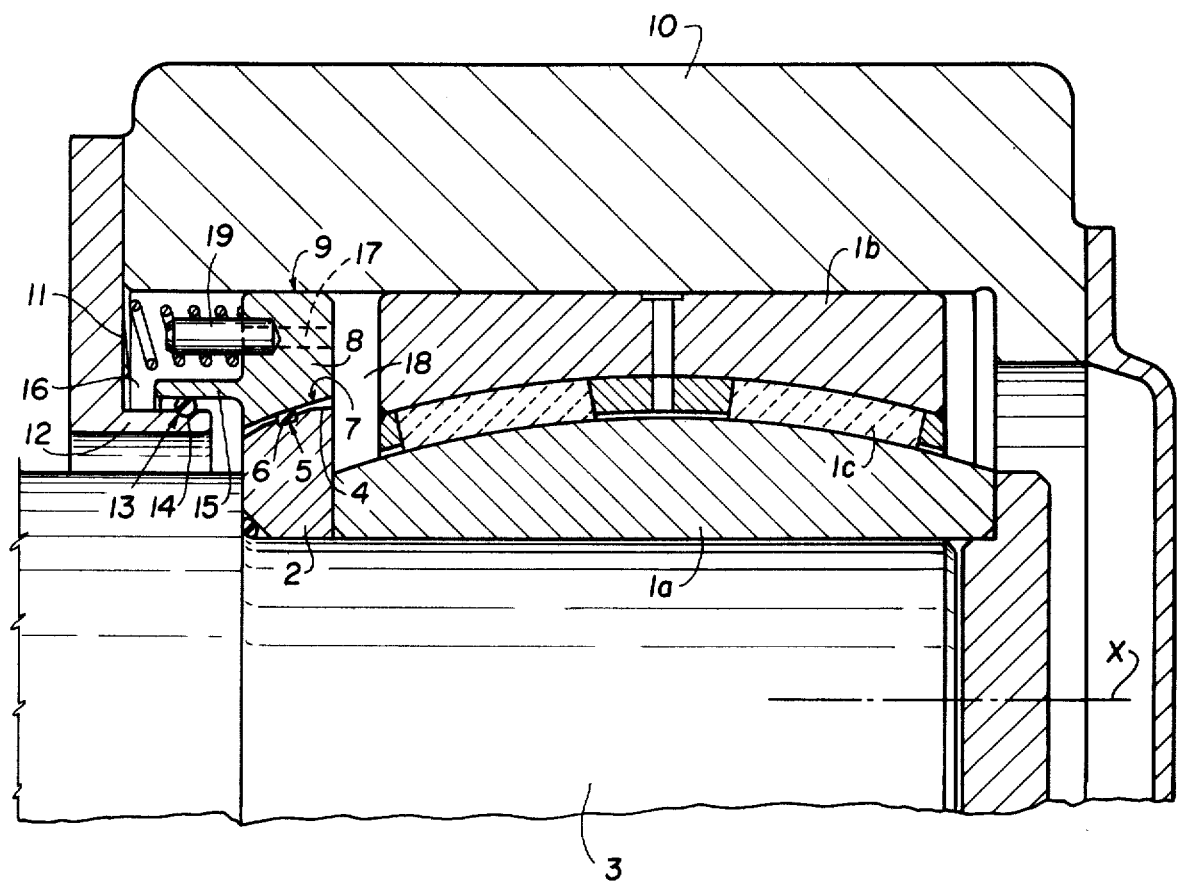

RESILIENT SEALING MEANS FOR SELF-ADJUSTING BEARINGS

BACKGROUND OF THE INVENTION

The present invention relates to spherically adjustable bearings and/or adjustable slide bearings in which seal means are provided to enclose the bearing.

Spherical bearings and/or adjustable slide bearings generally comprise a body in which an inner and outer race ring is mounted, the rings being separated by a plurality of roller elements. A shaft is secured within the inner race ring. Bearings of this type are subject to spherical adjustment and movement as well as axial adjustment and movement due to the positioning of the shaft during operation of the shaft itself. The seal means is intended to seal the bearing against loss of lubricant or entrance of impurities and must be therefore designed to follow the adjustment, i.e. the angular movement or the axial shaft created by movement of the shaft. Consequently, the seal means must follow simultaneously both the angular movement and the axial shift, without there being at any time a negative influence upon the sealing effect.

A seal is known which consists of two parts which are positioned in relationship to each other by one or more springs. The parts are arranged so that they can slide with regard to one another and are provided with spherical sealing surfaces acting in conjunction with one another to provide a movable seal. In this well known type of seal no separate sealing components are provided between the axial sliding surfaces and thus lubricant can emerge through this gap upon the movement of the two parts of the seal. Thus lubricant is lost from within the bearing and dirt or other impurities may be caused to enter therein. Furthermore, the pivoting center of the spherical sealing surfaces and the pivoting center of the bearing do not always coincide particularly as a result of any axial shifting of the bearing members caused by the journaled shaft. As a result the sealing gap between the two members of the sealing means can be caused to increase due to the axial shifting and the simultaneous oblique positioning of the bearing itself, so that a perfect seal can neither be obtained initially nor maintained over a long period of time.

It is the object of the present invention to provide a spherical and/or slide bearing which is provided with seal means overcoming the disadvantages and defects of the prior art.

It is a further object of the present invention to provide a seal means system for spherically adjustable bearings and/or adjustable slide bearings in which the seal means is itself adjustable with respect to any axial shift or angular displacement without any undue or negative influence upon the sealing effect.

These objects, other objects as well as numerous advantages will be seen from the following description of the preferred embodiment of the present invention.

SUMMARY OF THE INVENTION

According to the present invention a spherically adjustable bearing or an adjustable slide bearing is provided having a body in which an inner and outer ring adapted to journal a shaft is mounted. The bearing is provided with sealing means for axially closing the bearing which comprises a pair of sealing discs, one of which is axially movable with respect to the other. The discs are provided with cooperating surfaces acting in conjunction with each other to provide an adjustably movable seal, a locking ring is provided to support the seal means in the bearing and spring means is interposed between the locking ring and the movable disc to normally bias the movable disc with respect to the other disc. The locating ring and the movable disc are provided with axially overlapping members which form an adjustable seal movable in response to the axial or angular adjustment of the bearing itself.

Preferably the locking ring is L-shaped in cross section and the movable disc is provided with an axially projecting cylinder surface. The base of the locking ring and the annular projecting circumferential surface overlap each other at least to an extent to which the movable disc of the seal means is itself movable. The axially movable shank of the L-shaped locking ring and its cooperating axially projecting cylindrical surface form an additional seal, i.e. an additional seal to that created by the slidable seal surfaces. This additional seal acts independently of the axial shift of the bearing and the movale sealing disc itself.

The sealing effect of this arrangement can be further improved by inserting between the cooperating surfaces of the disc which act in conjunction with one another to provide the primary sealing means and between the axially overlapping surfaces forming the secondary sealing means an annular packing member. This annular packing member may be an elastic O-ring, a compressible packing cord or the like.

The sealing means is arranged so that it forms two chambers within the body, one chamber facing the frontal end of the bearing race rings while the other chamber facing oppositely to the locking ring. It is advantageous to compensate for changes in volume between the bearing chamber and the space between the terminal locking ring and the sealing discs themselves by providing a through bore extending through the movable disc so that the lubricating fluid may pass from one chamber to another allowing the disc a degree of freedom of movement.

Furthermore, the movable sealing disc is biased to be pressed normally against the other sealing disc member by one or more spiral springs having an axial component of force. The springs are preferably distributed over the periphery of the movable member and are provided with guide bores to insure the axial action.

Full details of the present invention will be seen from the following disclosure and from the accompanying drawing.

BRIEF DESCRIPTION OF THE DRAWING

In the drawing the FIGURE is a sectional view through the longitudinal axis of a bearing of the type described in which the present invention is applied.

DESCRIPTION OF THE INVENTION

In the FIGURE a spherical slide bearing is depicted which comprises an inner race ring 1a and an outer race ring 1b between which a plurality of sliding means 1c are arranged. The bearing is housed so that its outer race ring fits in a body 10 having an inner cylindrical bore, while its inner ring receives a shaft 3. The bearing is sealed by a sealing arrangement comprising a pair of concentric sealing discs 2 and 8. The radially inner sealing disc 2 abuts one end of the inner race ring 1a, the other end of which abuts against a fixed stop. The bearing and the seal means are concentric about the central axis of rotation indicated by the letter X. The sealing disc 2 is annular and is provided on its outer or jacket surface 4 with an annular groove 5 in which is retained an annular seal ring 6 (such as an elastic O-ring, a fabric packing ring or the like. The seal ring 6 is formed of compressive packing material and is adapted to slide against the inner surface 7 of the outer concentric disc 8. The outer disc 8 is provided with an outer or jacket surface 9 which conforms to the cylindrical bore of the housing 10. The jacket surface 9 is adapted to slide axially against the inner surface of the body 10. The surfaces 4 and 7 are substantially parallel to each other and define an arcuate or generally spherical cooperating seal surface which together with the packing seal 6 forms a movable sealing element. The sealing disc 8 is under axial compressive action of a plurality of spiral springs 11 uniformly spaced about the periphery of the disc 8 parallel to the axis X. The springs 11 bear at their outer end against an L-shaped terminal locking ring 12 which is fixedly secured to the body 10 by a bolt or other suitable means. The base or shank of the L-shaped terminal locking ring 12 is provided with an axially inwardly directed collar portion in which an annular groove 13 is formed. Seated within the annular groove 13 is an O-ring seal or other packing seal ring 14. The packing ring 14 engages the opposing surface of a cylindrical axially outwardly extending extension 15 projecting from and integrally fixed with the movable seal disc member 8. The outwardly projecting extension 15 and the inwardly extending collar of the terminal locking member 12 overlap each other so as to form a second seal means which seals off the space 16 formed by the movable disc 8 and the locking ring 12 in which the springs 11 are located. The outwardly extending projection 15 and the inwardly extending collar overlap each other a distance at least equal to the axial movement of the disc 8 so that this secondary seal is maintained. The packing member 14 acts in conjunction with the overlapping surfaces to provide and insure an adequate and perfect seal.

The movable seal disc is provided with one or more axial through bores 17 which serve to connect the space 16 with the space 18 which is defined by the seal means 2 and 8 and the outer and inner race rings 1a and 1b. Thus volumetric changes between the two spaces 16 and 18 on movement of the disc 8 are compensated for and fluid or lubricant retained in the spaces may be free to flow between them without the creation of any undue pressure within the bearing itself.

To prevent the springs 11 from bulging or moving out of position, a guide pin or bolt 19 is secured to the movable disc 8 to extend within the interior of each of the spring 11.

It will thus be obvious that as the bearing is caused to shift either angularly about its spherical adjustment range or axially shift because of the load placed on the bearing by the shaft 3 the annular disc 2 may be caused to move with respect to the movable disc 8. Nevertheless the spherical seal formed between the movable disc 2 and 8 will maintain the seal. Since the movable disc 8 is movable only in the axial direction the seal between its projecting cylindrical member 15 and the shank of the terminal locking means 12 remains in a constant position, thus maintaining the secondary seal between them even though the bearing may be angularly or axially shifting. The packing seals 6 and 14 act to insure the maintenance of a perfect seal and are compressed under action of the springs 11 as well as under the radial compressive force provided by the body 10 on the movable disc 8. While angular or axial shifting of the bearing itself may cause an enlargement or reduction in the space 18 between it and the seal means 2 and 8 the through bores 17 will allow for the flow of fluid from that chamber into chamber 16. In no event will the bearing loose fluid since the secondary seal and the packing 14 prevent the expulsion of the lubricant from the bearing.

While the opposing surfaces 4 and 7 forming the primary seal are suggested as being spherical they may be provided with a more simple bevel which permits the same cooperative action to provide the sealing system. In addition the seal suggested in the present disclosure as being placed on one side of the bearing may also be arranged on both sides of the bearing in place of the fixed stop member shown. Furthermore, the present invention may be employed in other types of spherical adjustable bearings on other similar situations.

Various changes, modifications and embodiments will be obvious to those skilled in the present art. It is intended therefore that the present disclosure be taken as illustrative only and not as limiting in any manner of the scope of the present invention.

What is claimed is:

1. A spherically adjustable bearing having a body, an inner and outer race ring mounted therein, sealing means for axially closing one end of said bearing comprising a pair of concentric sealing discs, one of which being axially movable with respect to the other, said discs having cooperating surfaces and means acting in conjunction with said surfaces to provide a first seal therebetween, said movable sealing disc having an axial flange extending away from the one end of said bearing, a locking ring for supporting said movable sealing disc, said locking ring being secured to said body and having an axial flange extending adjacent the axial flange of said movable disc, spring means interposed between said locking ring and said movable disc to normally bias said movable disc with respect to the other disc, and means interposed between the extending flanges of said locking ring and said movable disc to form a second seal for said movable disc.

2. The bearing according to claim 1 wherein said locking ring is L-shaped in cross section and has a radially extending portion secured to said body and a cylindrical portion forming the axial flange, the axial flange of said movable disc has a projectng cylindrical surface, said cylindrical portion of said locking ring and the projecting cylindrical surface of said movable disc overlapping each other in cooperative relationship.

3. The bearing according to claim 2 wherein the overlap of said projecting cylindrical surface of said movable disc and the cylindrical portion of said L-shaped locking ring is equal in length at least to the extent said movable sealing disc is axially movable.

4. The bearing according to claim 1 including a compressive annular seal ring inserted between the adjacent flanges of the locking ring and the movable sealing disc.

5. The bearing according to claim 1 including a compressive annular sealing ring inserted between the cooperating surfaces of the concentric sealing discs.

6. The bearing according to claim 1 including at least one axial through bore formed in said movable disc to compensate for changes in volume between the movable sealing disc and the bearing and between the movable sealing disc and the locking ring created on the movement of said disc.

7. The bearing according to claim 1 wherein said spring means are distributed about the periphery of said movable sealing disc, each being provided with a guide bolt fixed to said movable disc and inserted through said spring to support said movable sealing disc against rotation.

* * * * *